US010748128B2

(12) United States Patent
Lam et al.

(10) Patent No.: US 10,748,128 B2
(45) Date of Patent: *Aug. 18, 2020

(54) SYSTEM AND METHOD FOR MANAGING PREPAID CARDS

(71) Applicant: Walmart Apollo, LLC, Bentonville, AR (US)

(72) Inventors: Kam Lam, Bentonville, AR (US); Anthony Hylton, Bentonville, AR (US); Mark Matthews, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 115 days.

This patent is subject to a terminal disclaimer.

(21) Appl. No.: 15/902,627

(22) Filed: Feb. 22, 2018

(65) Prior Publication Data

US 2018/0181942 A1 Jun. 28, 2018

Related U.S. Application Data

(63) Continuation of application No. 13/744,775, filed on Jan. 18, 2013, now Pat. No. 9,928,497.

(51) Int. Cl.
*G06Q 20/28* (2012.01)
*G06Q 20/18* (2012.01)
(Continued)

(52) U.S. Cl.
CPC .............. *G06Q 20/28* (2013.01); *G06Q 20/18* (2013.01); *G06Q 20/204* (2013.01);
(Continued)

(58) Field of Classification Search
USPC ........................................................ 705/23
See application file for complete search history.

(56) References Cited

U.S. PATENT DOCUMENTS

| 20,032,044 | 10/2003 | Yamagishi |
| 20,061,515 | 7/2006 | Chen et al. |

(Continued)

FOREIGN PATENT DOCUMENTS

| JP | 2002-157530 A | 5/2002 |
| KR | 20100012577 A | 2/2010 |

(Continued)

OTHER PUBLICATIONS

ISR PCT/US2014/012009; May 23, 2014.
Written Opinion PCT/US2014/012009; dated May 23, 2014.

*Primary Examiner* — Garcia Ade
(74) *Attorney, Agent, or Firm* — McCarter & English, LLP; David R. Burns

(57) ABSTRACT

A point-of-sale system is provided that permits users to self-manage prepaid debit cards. Such a system may be capable of identifying and managing a number of different prepaid debit cards provided by different card issuers. The system may permit, for example, a user to purchase, activate, load funds, or perform other management operations with such cards. The system may also enforce restrictions associated with particular card types, and follow process flows for activating and performing other operations of such cards. The system may also be easily extendible to other types of prepaid cards through established card network relationships.

20 Claims, 14 Drawing Sheets

(51) Int. Cl.
    *G06Q 20/20*     (2012.01)
    *G06Q 20/34*     (2012.01)
    *G06Q 20/40*     (2012.01)
    *G06Q 30/06*     (2012.01)

(52) U.S. Cl.
    CPC ......... *G06Q 20/206* (2013.01); *G06Q 20/208* (2013.01); *G06Q 20/347* (2013.01); *G06Q 20/349* (2013.01); *G06Q 20/354* (2013.01); *G06Q 20/4012* (2013.01)

(56)        References Cited

U.S. PATENT DOCUMENTS

| | | |
|---|---|---|
| 20,093,194 | 12/2009 | Sibson |
| 20,121,367 | 5/2012 | Underwood |
| 20,122,841 | 11/2012 | Summerrow et al. |
| 20,130,466 | 2/2013 | Grigg et al. |
| 2003/0204472 A1* | 10/2003 | Yamagishi ........... G06Q 10/109 705/41 |
| 2006/0151598 A1* | 7/2006 | Chen ...................... G06O 20/20 235/380 |
| 2007/0071197 A1 | 3/2007 | Ryoo |
| 2009/0319406 A1* | 12/2009 | Sibson .................. G06Q 20/14 705/34 |
| 2012/0284183 A1* | 11/2012 | Summerrow .......... G06Q 40/02 705/42 |
| 2013/0046645 A1* | 2/2013 | Grigg .................... G06Q 30/06 705/26.1 |

FOREIGN PATENT DOCUMENTS

| | | |
|---|---|---|
| KR | 20110135260 A | 12/2011 |
| WO | 2005-043277 A2 | 5/2005 |

\* cited by examiner

SYSTEM AND METHOD FOR MANAGING PREPAID CARDS

CROSS-REFERENCE TO RELATED PATENT APPLICATION

This application is a continuation application of U.S. patent application Ser. No. 13/744,775 which was filed Jan. 18, 2013, the content of which is hereby incorporated by reference in its entirety.

BACKGROUND

There are many different types of cards that can be used for payment in transactions involving goods and services. For instance, there are prepaid debit cards and gift cards that can be purchased that allow users to apply balances towards a transaction. Some cards, such as gift cards may be restricted for use at particular stores. Other cards, such as prepaid debit cards, may be used for transactions in most circumstances, where other types of cards (e.g., credit, debit cards, etc.) are typically accepted. Prepaid debit cards have become very popular for performing transactions.

SUMMARY

According to one aspect, it is appreciated that it may be useful and particularly advantageous to allow customer/users to purchase and manage prepaid debit cards. According to one embodiment, a point-of-sale (POS) system may be provided that allows for easy purchased and recharging of prepaid debit cards. For instance, such a POS system may be provided in a store or other retail location (e.g., in the form of a kiosk) that permits the end user of the prepaid debit card to purchase and/or recharge (e.g., place additional funds on the card) the prepaid debit card without the need for a teller, merchant system operator or other person to complete the transaction. Thus, the ease of use and management of prepaid debit cards is increased.

According to another aspect, a POS system that works with a variety of types of prepaid cards may be useful. Because there are different varieties of cards that may be purchased, a POS system that recognizes and processes transactions involving such cards would be beneficial and more widely accepted. Such system may be provided at a number of retail establishments that would provide ease and access to prepaid card management functions.

According to various embodiments, the POS system may be capable of performing a number of functions, such as purchasing and recharging prepaid debit cards. In one embodiment, the system may permit the user to recharge a debit card by inputting a variable amount of funds. Such funds may be provided by the user at the POS system, in the form of money, check, cashed check, electronic funds transfer from another account or other funding source. In one embodiment, funding may be restricted to cash or pin-based debit card funding sources. In particular, with an entirely user-operated system, it may be beneficial to use funding sources that can be verified at the time of the transaction. In one embodiment, funding sources such as government-issued checks, certified checks, bank checks, or similar verified funding sources also may be permitted.

The POS system may also permit an initial purchase and activation of a prepaid debit card. To this end, the POS may include a scanner or other device capable of identifying a prepaid debit card for activation, and permitting the user to purchase and/or fund the card. In one embodiment, the prepaid debit card may be part of a kit that is sold at the POS location, and can be purchased at the POS system by an end user without the assistance of retail personnel at the POS location.

The system may also be capable of performing other functions, such as checking balances, transferring funds, or other management functions associated with prepaid debit cards. In one embodiment, funds can be withdrawn via ATM functionality as any conventional ATM provider would for a withdrawal fee, if applicable.

According to one aspect of the present invention, a system is provided for processing a transaction using a prepaid debit card. The system comprises a memory, a processor coupled to the memory, and a user interface coupled to the processor and memory, the interface being configured to read an identifier of a prepaid debit card and wherein the processor is configured to identify at least one prepaid debit card type of the prepaid debit card from a plurality of prepaid debit card types provided by a plurality of card providers, and perform, on behalf of an end user of the prepaid debit card, at least one of a plurality of permitted functions with the identified at least one prepaid debit card type, the functions including at least one of purchasing the prepaid debit card, loading funds to the prepaid debit card, and checking a balance of prepaid debit card.

According to one embodiment, the system is located at a point of sale (POS) location, and wherein the user interface is operable by the end user of the prepaid debit card. According to another embodiment, the user interface is operable solely by the end user of the of the prepaid debit card. According to another embodiment, the user interface is operable by the end user of the of the prepaid debit card absent intervention of retail personnel located at the POS location.

According to another embodiment, the processor is configured to determine, based on the at least one prepaid debit card type of the prepaid debit card, at least one restriction of the prepaid debit card. According to another embodiment, the processor is configured to enforce the restriction of the prepaid debit card on the end user of the prepaid debit card. According to another embodiment, the at least one restriction includes at least one of a balance limit, a load limit, a load amount, a prepaid amount, at least one amount of a plurality of fixed amounts, a capability of reload of the prepaid debit card, a withdrawal limit and an indication of at least one of a plurality of prepaid debit cards that are qualified to be managed by the system.

According to another embodiment, the system comprises a communication interface, the communication interface being configured to receive one or more advertisements, and wherein the interface is adapted to display the one or more advertisements to the end user of the of the prepaid debit card during a performance of the at least one of the plurality of permitted functions.

According to another embodiment, the system further comprises a scanner that is configured to scan a barcode of a sales kit sold at the POS location, the sales kit including the prepaid debit card, and wherein the wherein the processor is configured to identify the prepaid debit card responsive to the scan of the barcode of the sales kit. According to another embodiment, the end user of the prepaid debit card is permitted to purchase the prepaid debit card using the interface of the system. According to another embodiment, the end user of the prepaid debit card is permitted to purchase the prepaid debit card absent intervention of retail personnel located at the POS location.

According to another embodiment, the system further comprises a scanner that is configured to scan an identifier of the prepaid debit card. According to another embodiment, the scanner is configured to scan a magnetic strip of the prepaid debit card.

According to another embodiment, the system is configured to store, in the memory, a plurality of process flow information, each of the plurality of process flow information associated with a respective one of the plurality of prepaid debit card types provided by the plurality of card providers.

According to another embodiment, the processor is configured to execute a respective process flow of the plurality of process flow information responsive to an identification of a corresponding one of the plurality of prepaid debit card types provided by the plurality of card providers.

According to another aspect of the present invention, a method is provided for processing a transaction using a prepaid debit card. The method comprises acts of reading, by a computer system, an identifier of a prepaid debit card, identifying at least one prepaid debit card type of the prepaid debit card from a plurality of prepaid debit card types provided by a plurality of card providers, and performing, on behalf of an end user of the prepaid debit card, at least one of a plurality of permitted functions with the identified at least one prepaid debit card type, the functions including at least one of purchasing the prepaid debit card, loading funds to the prepaid debit card, and checking a balance of prepaid debit card.

According to one embodiment of the present invention, the computer system is located at a point of sale (POS) location, and wherein the computer system is operable by the end user of the prepaid debit card. According to another embodiment, the computer system is operable solely by the end user of the prepaid debit card, and the acts of performing are performed responsive solely to input provided by the end user. According to another embodiment, the computer system includes a user interface, and wherein the user interface is operable by the end user of the of the prepaid debit card absent intervention of retail personnel located at the POS location. According to another embodiment, the acts of performing are performed responsive to input provided by the end user absent intervention of retail personnel located at the POS location.

According to another embodiment, the method further comprises an act of determining, by the system, based on the at least one prepaid debit card type of the prepaid debit card, at least one restriction of the prepaid debit card. According to another embodiment, the method further comprises an act of an act of enforcing, by the computer system, the at least one restriction of the prepaid debit card on the end user of the prepaid debit card. According to another embodiment, the at least one restriction includes at least one of a balance limit, a load limit, a load amount, a prepaid amount, at least one amount of a plurality of fixed amounts, a capability of reload of the prepaid debit card, a withdrawal limit, and an indication of at least one of a plurality of prepaid debit cards that are qualified to be managed by the system.

According to another embodiment, the system comprises a communication interface and a user interface, and wherein the method further comprises acts of receiving, by the communication interface, one or more advertisements, and displaying, by the user interface to the end user of the prepaid debit card, the one or more advertisements during a performance of the at least one of the plurality of permitted functions.

According to another embodiment, the system further comprises a scanner that is operable by the end user, and wherein the method further comprises acts of scanning a barcode of a sales kit sold at the POS location, the sales kit including the prepaid debit card, and identifying, by the system, the prepaid debit card responsive to the scan of the barcode of the sales kit. According to another embodiment, the end user of the prepaid debit card is permitted to purchase the prepaid debit card using an interface of the system. According to another embodiment, the method further comprises an act of permitting, by the system, the end user of the prepaid debit card to purchase the prepaid debit card absent intervention of retail personnel located at the POS location.

According to another embodiment, the method further comprises an act of scanning, by the system, an identifier of the prepaid debit card. According to another embodiment, the method further comprises an act of scanning a magnetic strip of the prepaid debit card. According to another embodiment, the method further comprises an act of storing, in a memory of the computer system, a plurality of process flow information, each of the plurality of process flow information associated with a respective one of the plurality of prepaid debit card types provided by the plurality of card providers. According to another embodiment, the method further comprises an act of executing, by the system, a respective process flow of the plurality of process flow information responsive to an identification of a corresponding one of the plurality of prepaid debit card types provided by the plurality of card providers.

According to another aspect of the present invention, a system is provided for processing a transaction using a prepaid debit cards. The system comprises a memory, a processor coupled to the memory, and a user interface coupled to the processor and memory, the user interface being configured to read an identifier of a prepaid debit card and wherein the processor is configured to perform, on behalf of an end user of the prepaid debit card, at least one of a plurality of permitted functions with the prepaid debit card, wherein the user interface is operable solely by the end user of the of the prepaid debit card.

According to one embodiment, the functions include at least one of purchasing the prepaid debit card, loading funds to the prepaid debit card, and checking a balance of prepaid debit card. According to another embodiment, the system is located at a point of sale (POS) location, and the user interface is operable by the end user of the prepaid debit card.

According to another embodiment, the user interface is operable by the end user of the of the prepaid debit card absent intervention of retail personnel located at the POS location. According to another embodiment, the processor is configured to identify at least one prepaid debit card type of the prepaid debit card from a plurality of prepaid debit card types provided by a plurality of card providers. According to another embodiment, the processor is configured to determine, based on the at least one prepaid debit card type of the prepaid debit card, at least one restriction of the prepaid debit card.

According to another embodiment, the system further comprises a scanner that is configured to scan a barcode of a sales kit sold at the POS location, the sales kit including the prepaid debit card, and wherein the wherein the processor is configured to identify the prepaid debit card responsive to the scan of the barcode of the sales kit. According to another embodiment, the end user of the prepaid debit card is permitted to purchase the prepaid debit card using the interface of the system. According to another embodiment, the end user of the prepaid debit card is permitted to purchase the prepaid debit card absent intervention of retail personnel located at the POS location.

According to another aspect of the present invention, a method is provided for processing a transaction using a prepaid debit cards. The method comprising acts of reading, by a system located at a point-of-sale (POS) location, an identifier of a prepaid debit card and performing by the system, on behalf of an end user of the prepaid debit card, at least one of a plurality of permitted functions with the prepaid debit card, wherein the user interface is operable solely by the end user of the of the prepaid debit card.

According to one embodiment, the functions include at least one of purchasing the prepaid debit card, loading funds to the prepaid debit card, and checking a balance of prepaid debit card. According to another embodiment, the system comprises a user interface, and wherein the user interface is operable by the end user of the prepaid debit card. According to another embodiment, the system comprises a user interface, and wherein the user interface is operable by the end user of the of the prepaid debit card absent intervention of retail personnel located at the POS location.

According to another embodiment, the method further comprises an act of identifying, by the system, at least one prepaid debit card type of the prepaid debit card from a plurality of prepaid debit card types provided by a plurality of card providers. According to another embodiment, the method further comprises an act of determining, by the system based on the at least one prepaid debit card type of the prepaid debit card, at least one restriction of the prepaid debit card.

According to another embodiment, the system further comprises a scanner operable by the user, and wherein the method further comprises an act of scanning, by the scanner, a barcode of a sales kit sold at the POS location, the sales kit including the prepaid debit card, and wherein the method further comprises an act of identifying the prepaid debit card responsive to the scan of the barcode of the sales kit. According to another embodiment, the method further comprises an act of permitting, by the system, the end user of the prepaid debit card to purchase the prepaid debit card using the interface of the system.

According to another embodiment, the method further comprises an act of permitting, by the system, the end user of the prepaid debit card to purchase the prepaid debit card absent intervention of retail personnel located at the POS location.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

Figure 1:
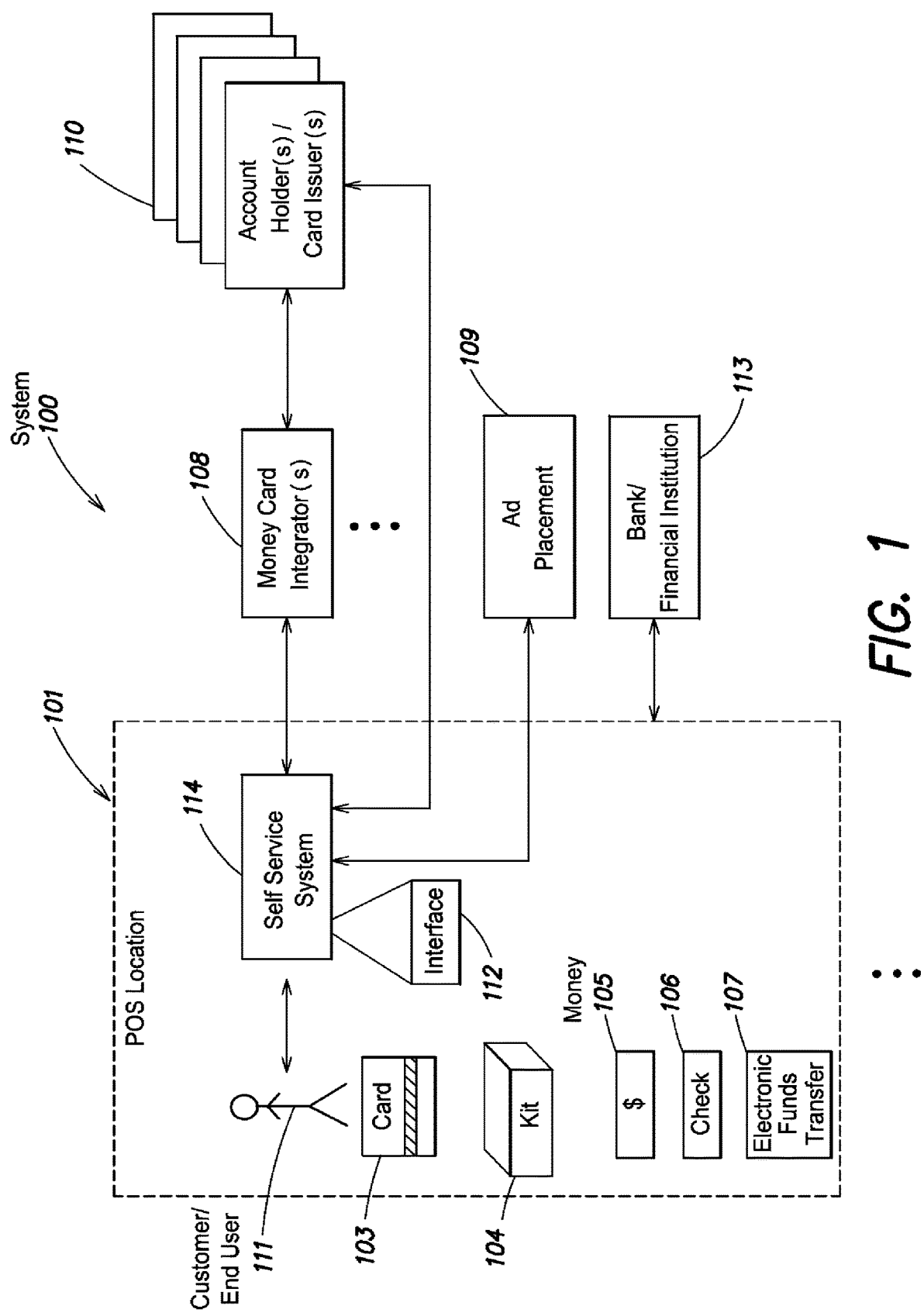
FIG. 1 is a block diagram showing a distributed system for managing prepaid debit cards according to various aspects of the present invention.

FIG. 1 shows a block diagram of a system 100 suitable for implementing various aspects of the present invention. In particular, according to one embodiment, a self-service system 114 is provided at a point-of-sale (POS) location 101 that permits a customer/end user 111 to perform various management functions with a prepaid debit card.

For instance, as discussed, and end user (e.g., user 111) is permitted to perform various management functions with a prepaid debit card (e.g., card 103) without having to interact with retail personnel (e.g., a cashier) at a POS location 101. To this end, self-service system 114 may provide a user interface (e.g., interface 112) that permits user 111 to perform various management functions. For instance, user 111 a management existing prepaid debit card (e.g., card 103) for the purposes of checking balances, adding funds to the card or performing other management functions. In another example, a prepaid debit card may be packaged within a kit 104 that is provided for sale at the POS location 101. To activate the prepaid debit card contained within the kit, user 111 may interact with the self-service system 114 to purchase the kit and enable the contained prepaid debit card.

User 111 may be permitted to load the prepaid debit card through any number of sources including money 105, PIN-based debit card (not shown), check 106, electronic funds transfer 107 (e.g., from another account) or other finding method. According to one embodiment of the invention, user 111 is permitted to initially fund a prepaid debit card and reload funds to an active prepaid debit card using self-service system 114.

Self-service system 114 may be coupled to one or more systems for managing accounts associated with prepaid debit cards from one or more card issuers (account holder(s)/card issuer(s) 110). Self-service self-service system 114 may communicate directly with one or more card issuers or may perform functions using one or more money card integrator(s) 108.

Further, self-service system 114 may be coupled to offer an advertising placement 109 component for the purpose of displaying the ads to end-users (e.g., user 111) within a display interface (e.g., interface 112). The ad placement component 109 may be capable of receiving ads and displaying them during one or more service points during a session. Self-service system 114 also may be coupled to one or more banks or other financial institutions (e.g., element 113) for the purpose of receiving, sending, or otherwise managing funds transfers to other accounts.

Figure 2:
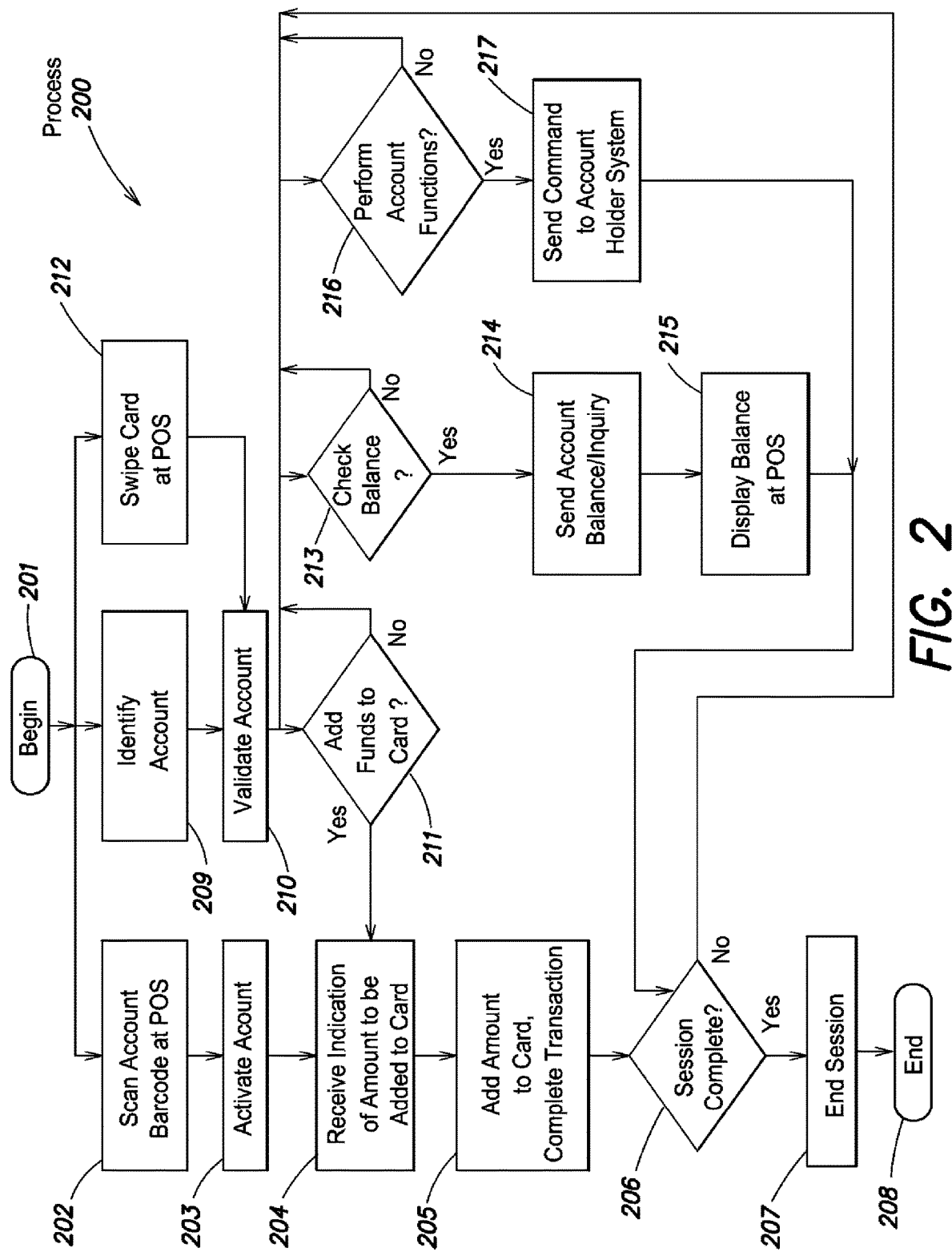
FIG. 2 shows a process for managing a prepaid debit card according to various embodiments of the present invention.

FIG. 2 shows a process 204 managing prepaid debit cards according to one embodiment of the invention. At block 201, process 200 begins. At block 202, a system (e.g., self-service system 114) scans an account barcode at a point of service (POS). For instance, self-service system 114 may be equipped with a barcode reader that permits a user (e.g., user 111) to scan a barcode associated with kit 104 that contains a prepaid debit card, and the user utilizes the self-service system 114 to purchase and activate the contained prepaid debit card. Once identified by the barcode scanner, the prepaid debit card may be activated at block 203.

The self-service system 114 may include an interface which allows a user to enter in an amount of funds to be added to the prepaid debit card. At block 204, the system may receive an indication of an amount to be added to the card. Such amounts, according to one embodiment, may include a variable amount specified by a user within a determined range. Depending on the type of prepaid debit card and any restrictions relating to the card type (e.g., as provided by the card issuer), the self-service system may impose limits on the user regarding the amount of funds that can be added to the card.

At block 205, self-service system 114 adds the specified amount to the prepaid debit card and completes the transaction. Completion of the transaction may include performing functions with one or more funding sources, money card integrators, or card issuers. Alternatively, if the prepaid debit card is already activated for any use, the user may be permitted to perform one or more management functions associated with the card. According to one embodiment, a user (e.g. user 111) may identify an account of a prepaid debit card at block 209 to the self-service system (e.g., system 114). In one embodiment, the user may swipe the prepaid debit card at the point-of-sale location at block 212. To this end, the self-service system may include a magnetic card reader (e.g., a PIN pad or other scanning element) that can identify the prepaid debit card. At block 210, the system validates the account associated with the card indicated by the scanned identifier.

After the account has been validated, the user may be permitted to perform one or more management functions associated with that card. For instance, at block 211 it may be determined whether the user would like to add funds to the card. If so, the system may receive an indication of an amount to be added to the card (e.g., at block 204). At block 213, if it is determined that the user would like to check the balance associated with certain cards, the system may send an account balance/inquiry at block 214, to one or more systems that are capable of fulfilling the request. At block 215, the system displays the balance at the point-of-sale to the user. For instance, the display may be performed within an interface of the self-service system (e.g., as shown in a display of a kiosk).

At block 216, it may be determined whether the user would like to perform other account functions associated with prepaid debit card. If so, the self-service system may send one or more commands to an account holder system at block 217, either directly or through one or more other systems.

At block 206, if it is determined that the session is complete, the session is ended at block 207. At block 208, process 200 ends.

Figure 3A:
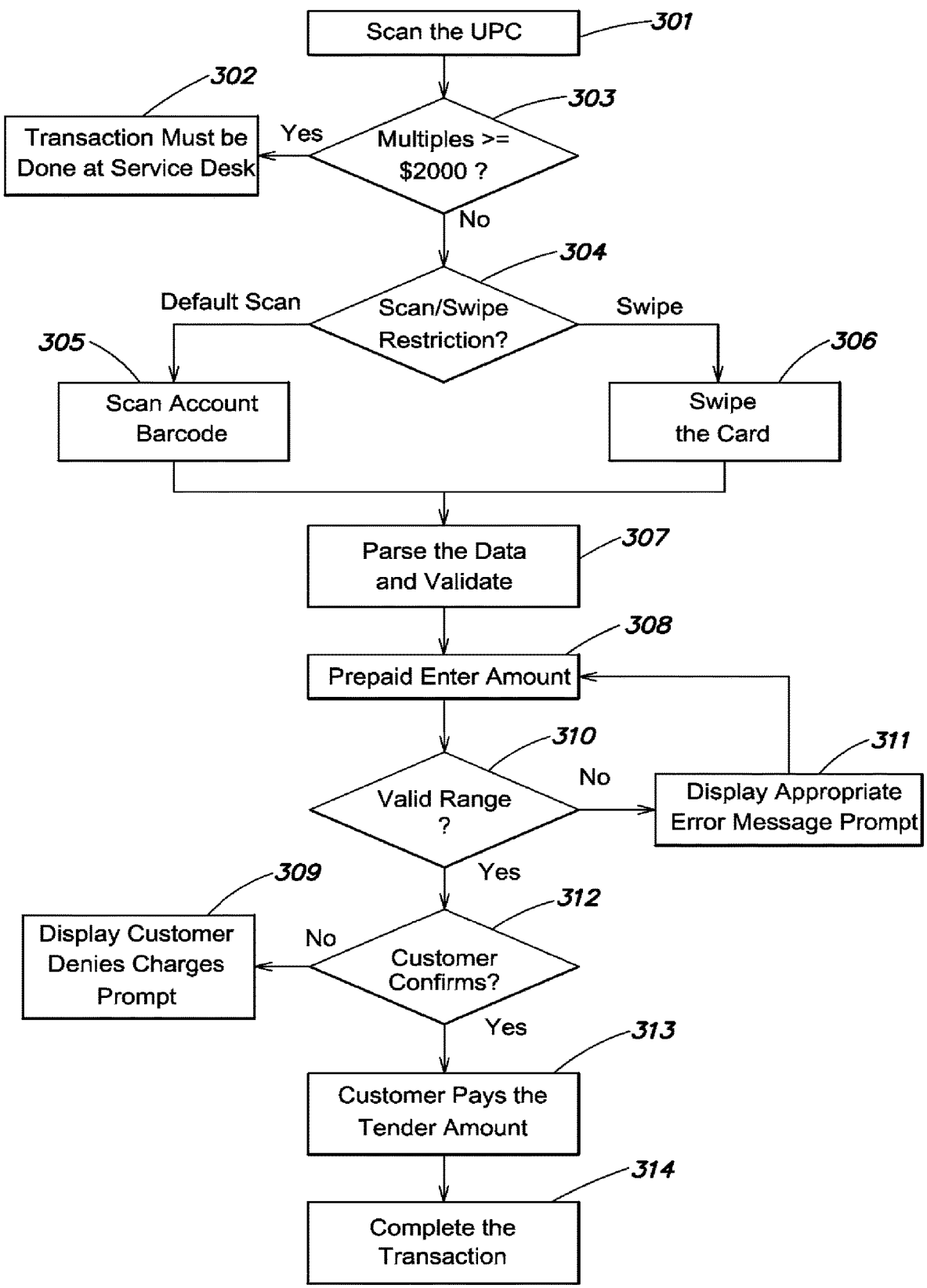
FIGS. 3A-3B shows several processes for managing debit cards according to various embodiments of the present invention.

FIG. 3A shows a more detailed process for managing a debit card according to one embodiment of the invention. At block 301, the system (e.g., self-service system 114) scans a UPC barcode associated with the prepaid debit card. If, at block 303, it is determined that any limits of the card or exceeded (e.g., the amount is greater than $2000 or other limitation), the system may prompt the user to indicate that a particular transaction must be performed at the service desk or by other retail personnel at block 302.

At block 304, it is determined whether there is a restriction with the card to scan an account barcode or the card needs to be swiped. In one embodiment, a default may be provided that allows the user to scan the account barcode at block 305. Alternatively, or in addition to scanning a barcode or providing some other identification, the user may swipe the card print (e.g., by swiping the card by a magnetic stripe reader device) at block 306. Data associated with the card is parsed and validated at block 307.

At block 308, the user enters a prepaid amount to be added to the card. If the amount is within a valid range as determined at block 310, the customer confirms within the interface that the amount is correct at block 312. If not, a prompt is displayed to the customer that denies the charge at block 309, and the user is permitted to reenter a prepaid amount at block 308. If it is determined that the entered amount is not within a valid range, an appropriate error message may be displayed by the system at block 311.

If the amount is valid and the customer confirms that the amounts should be charged, the customer pays the tender amount at block 313. The amount may be paid, for instance, by the user adding cash, a PIN-based debit card, a check, electronic funds transfer, or other funding method. At block 314, the system completes the transaction.

Figure 3B:
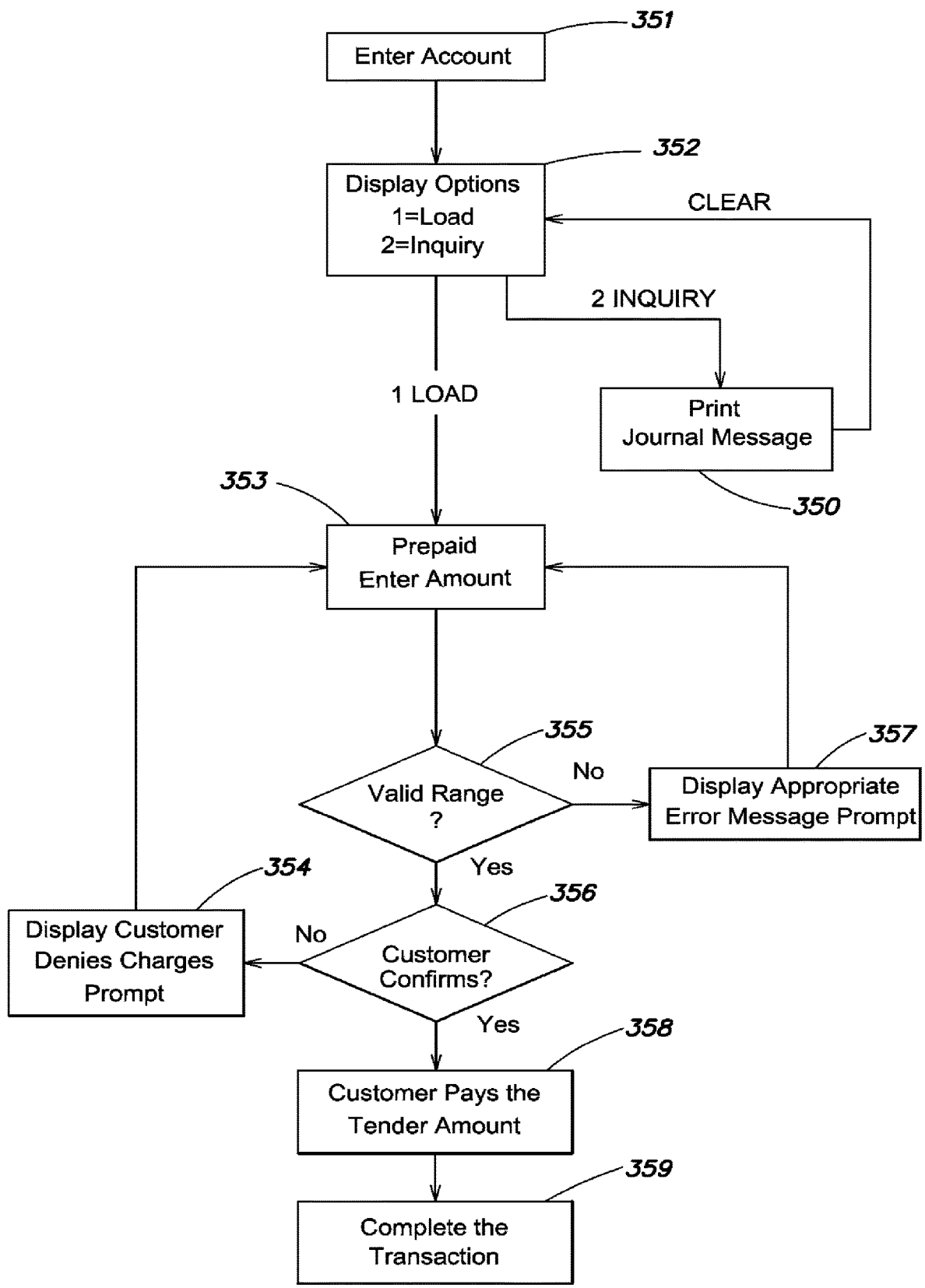

FIG. 3B shows another more detailed method for managing a prepaid debit card according to one embodiment of the present invention. A block 351, the customer may provide a permanent prepaid card to initiate the transaction (e.g., by swiping their card by a magnetic card reader). In one embodiment, the customer may be required to provide the permanent prepaid card to initiate a transaction. At block 352, the system may display one or more management options for the card. For instance, the user may be permitted to load funds to the card or perform a balance inquiry, among other functions. If a load option is entered by the user with an interface, the user may enter a prepaid amount of block 353. If an inquiry option is chosen by the user within the interface, the system may print a journal message on a printer or otherwise display the balance to the user at block 350.

After the user enters a prepaid amount, it may be determined at block 355 whether the amount is within a valid range as determined at block 355, the customer confirms within the interface that the amount is correct at block 356. If not, a prompt is displayed to the customer that denies the charge at block 354, and the user is permitted to reenter a prepaid amount at block 353. If it is determined that the entered amount is not within a valid range, an appropriate error message may be displayed by the system at block 357.

If the amount is valid and the customer confirms that the amounts should be charged, the customer pays the tender amount at block 358. The amount may be paid, for instance, by the user adding cash, a PIN-based debit card, a check, electronic funds transfer, or other funding method. According to one embodiment, the system may restrict the customer to either cash or a PIN-based debit card funding source. At block 359, the system completes the transaction.

Figure 4:
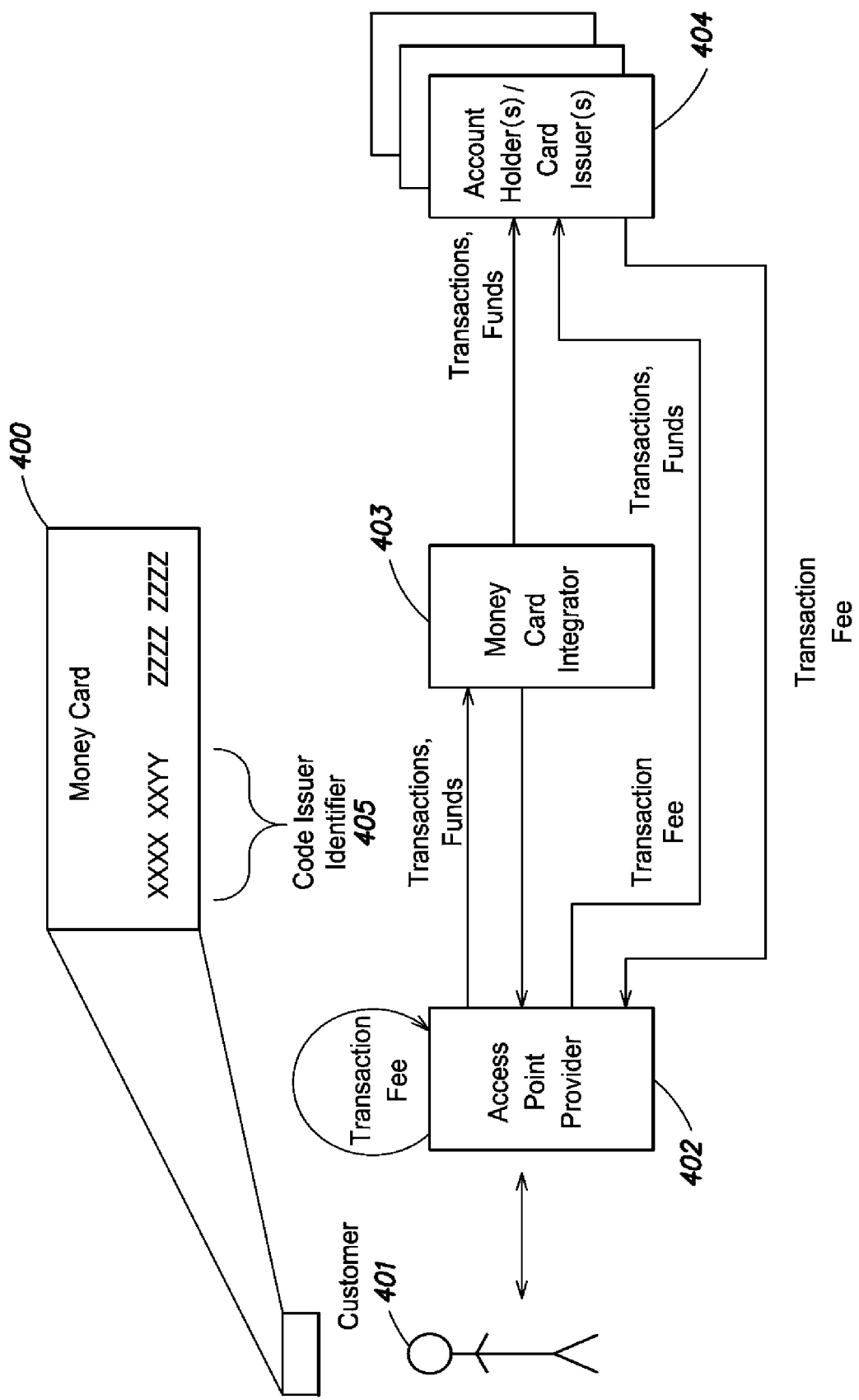
FIG. 4 shows an exemplary system for managing prepaid debit cards according to one embodiment of the present invention.

FIG. 4 shows an example distributed system for managing prepaid debit cards according to one embodiment of the present invention. According to our environment, a customer (e.g., customer 411) interacts with an access point provider 402 to manage a money card 400. The access point provider may be, for example, an entity that has one or more point-of-sale locations, each of which may have one or more self-service systems (e.g., system 411) that permit customers (e.g., customer 401) to self manage their pre-paid debit cards. For the service, access point provider 402 may charge a transaction fee. According to one embodiment, such a transaction fee may be set to a low value to encourage participation and provide easier access to management functions for debit card customers.

According to another embodiment of the present invention, it is appreciated that there are many prepaid debit card types that are provided by multiple entities that need to be managed. It would be beneficial to provide, by an access point provider 402, a common access to users so that they may self-manage their prepaid debit cards in an easy manner. To this end, the access point provider 402 may provide a system that is integrated with one or more money card integrators (e.g., integrator 403) and one or more account holders/card issuers (e.g., account holder(s)/card issuer(s) 404).

For instance, an access point provider 402 such as Wal-Mart may provide one or more self-service systems (e.g., kiosks) at one or more Wal-Mart point-of-service locations (e.g., in-store locations). The self-service system may be configured to process multiple prepaid debit card types, including, but not limited to, the Wal-Mart PayCard, the Wal-Mart MoneyCard, the American Express General Purpose Reloadable (GPR) Prepaid Card, among other types of prepaid debit cards. The self-service system may interact with one or more debit card integrators (also called money card integrators), such as Green Dot (http://www.greendot.com) that provide different debit card offerings and provide systems that may be accessed to perform functions relating to their supported cards. Other systems may be used that provide interfaces to the self-service system so that certain cards may be activated, loaded, and otherwise managed. For instance, the InComm company may provide access to an American Express card via specialized management interfaces (e.g., a Payment Card Industry (PCI) compliant interface).

A system provided by the access point provider may communicate transactions, funds to one or more money card integrators and/or card issuers, either directly or through one or more other systems or providers. Such systems may also charge a transaction fee to the access point provider that can be passed on to users. In other cases, the access point provider 402 may charge a transaction fee to debit card issuers for providing management access for card users. According to one aspect of the present invention, it may be beneficial to provide a system that manages a variety of types of prepaid debit cards. To this end, a system (e.g., self-service system 114) may be provided that identifies different types of money cards and is capable of performing management functions on behalf of users with those particular identified types of cards. In one embodiment, the system may be provided that identifies particular prepaid debit card types based on issuer identifiers (e.g., identifier 405) associated with each card. Profiles associated with each identifier may be maintained by the system and is used to determine how the access point provider communicates with various entities.

The issuer identifier may include one or more identification numbers associated with the prepaid debit card, and may vary in size depending on the card issuer. For instance, the issuer identifier may range from the first 6-10 digits of the prepaid debit card number. The system may maintain, associated with each issuer identifier, a profile that includes, among other information, communication settings restrictions on a particular card type, valid load ranges or values, and the like. The system may be configured to recognize certain card number ranges (referred to commonly as BIN ranges).

The system may maintain particular profiles for each card type, including, but not limited to, bin range information for each card provider, restrictions on use of the card, and certain activation, verification, and/or reloading flows with each card (e.g., swipe vs. barcode read, both swipe and barcode read, etc.). There may also be certain communication flows that need to occur with certain transactions, which are stored and used by the self-service system. Profile information may be stored in a generalized data structure that would permit extension of the self-service system to other card types having different restrictions, processes and communication requirements. For instance, to fund an American Express (AMEX) prepaid card, the self-service system may need to send a communication including a transaction to be executed to an InComm system via a PCI-compliant connectivity, the InComm system communicates with an AMEX system to perform the transaction, AMEX communicates to the InComm system that the transaction was successfully performed, and the information may be communicated from the InComm system to the self-service system. Such a communication flow may be stored by the system an executed selectively when the particular card type is identified.

In one embodiment of the present invention, the system may permit transactions for purchase of initial starter/temporary cards that are UPC-driven, while reloads of activated cards are BIN range identifier-driven. In this manner, a user may, using the self-service system, be able to perform both the initial purchase and reloading of prepaid debit cards without assistance from intervention of retail personnel located at the POS location. In another embodiment, the self-service system may inspect identifiers associated with the prepaid debit card (e.g., BIN identifiers) to determine if management functions may be performed with the particular card, and if so, any restrictions on the card that may be imposed (e.g., by the card issuer).

As discussed, a self-service system (e.g., system 114) may be provided that permits user access and management functions for prepaid debit cards. System 114 may include one or more computer systems having various structures and capabilities as described further below. Further, system 114 may interact with other types of computer systems having similar functionality and capability as the example computer systems outlined below.

Example Computer Implementations

Processes described above are merely illustrative embodiments of systems that may purchase and manage prepaid debit cards. Such illustrative embodiments are not intended to limit the scope of the present invention, as any of numerous other implementations for performing the invention. None of the claims set forth below are intended to be limited to any particular implementation of debit card management system, unless such claim includes a limitation explicitly reciting a particular implementation.

Processes and methods associated with various embodiments, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. According to one embodiment, the computer-readable medium may be non-transitory in that the computer-executable instructions may be stored permanently or semi-permanently on the medium. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, ARM Cortex processor, Qualcomm Scorpion processor, or any other type of processor. It should be appreciated that one or more of any type computer system may be used to partially or fully automate management of prepaid debit cards according to various embodiments of the invention. Further, the software design system may be located on a single computer or may be distributed among a plurality of computers attached by a communications network.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

A computer system may be a general-purpose computer system that is programmable using a high-level computer programming language. Computer system may be also implemented using specially programmed, special purpose hardware. In a computer system there may be a processor that is typically a commercially available processor such as the well-known Pentium class processor available from the Intel Corporation. Many other processors are available. Such a processor usually executes an operating system which may be, for example, the Windows NT, Windows 2000 (Windows ME), Windows XP, Windows Vista, Windows 7, or Windows 8 operating systems available from the Microsoft Corporation, MAC OS X Snow Leopard, MAC OS X Lion operating systems available from Apple Computer, the Solaris Operating System available from Sun Microsystems, iOS, Blackberry OS, Windows 7 Mobile or Android OS operating systems, or UNIX available from various sources. Many other operating systems may be used.

Some aspects of the invention may be implemented as distributed application components that may be executed on a number of different types of systems coupled over a computer network. Some components may be located and executed on mobile devices, servers, tablets, or other system types. Other components of a distributed system may also be used, such as databases (e.g., the mongoDB database available from lOgen, Inc.), cloud services, or other component types.

The processor and operating system together define a computer platform for which application programs in high-level programming languages are written. It should be understood that the invention is not limited to a particular computer system platform, processor, operating system, or network. Further, it should be appreciated that multiple computer platform types may be used in a distributed computer system that implement various aspects of the present invention. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system.

For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP). Certain aspects of the present invention may also be implemented on a cloud-based computer system (e.g., the EC2 cloud-based computing platform provided by Amazon.com), a distributed computer network including clients and servers, or any combination of systems.

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Further, on each of the one or more computer systems that include one or more components of distributed system 100, each of the components may reside in one or more locations on the system. For example, different portions of the components of system 100 may reside in different areas of memory (e.g., RAM, ROM, disk, etc.) on one or more computer systems. Each of such one or more computer systems may include, among other components, a plurality of known components such as one or more processors, a memory system, a disk storage system, one or more network interfaces, and one or more busses or other internal communication links interconnecting the various components.

Figure 5:
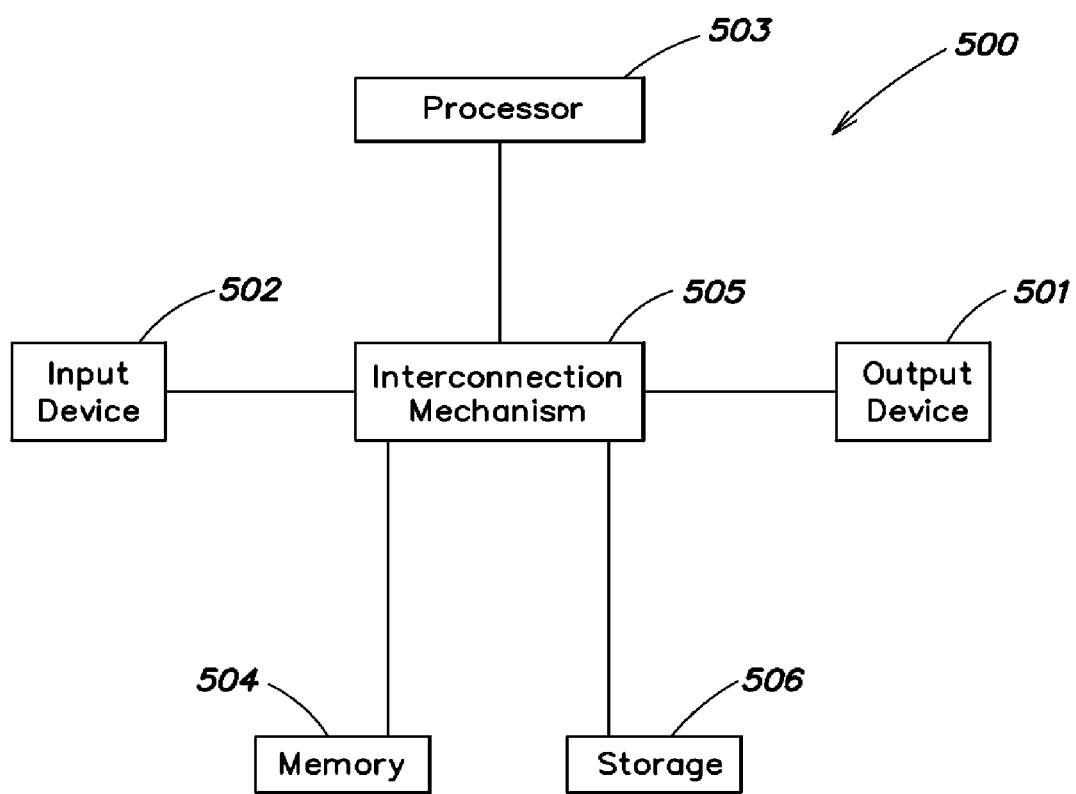
FIG. 5 shows an example computer system with which various aspects of the invention may be practiced.
Figure 6:
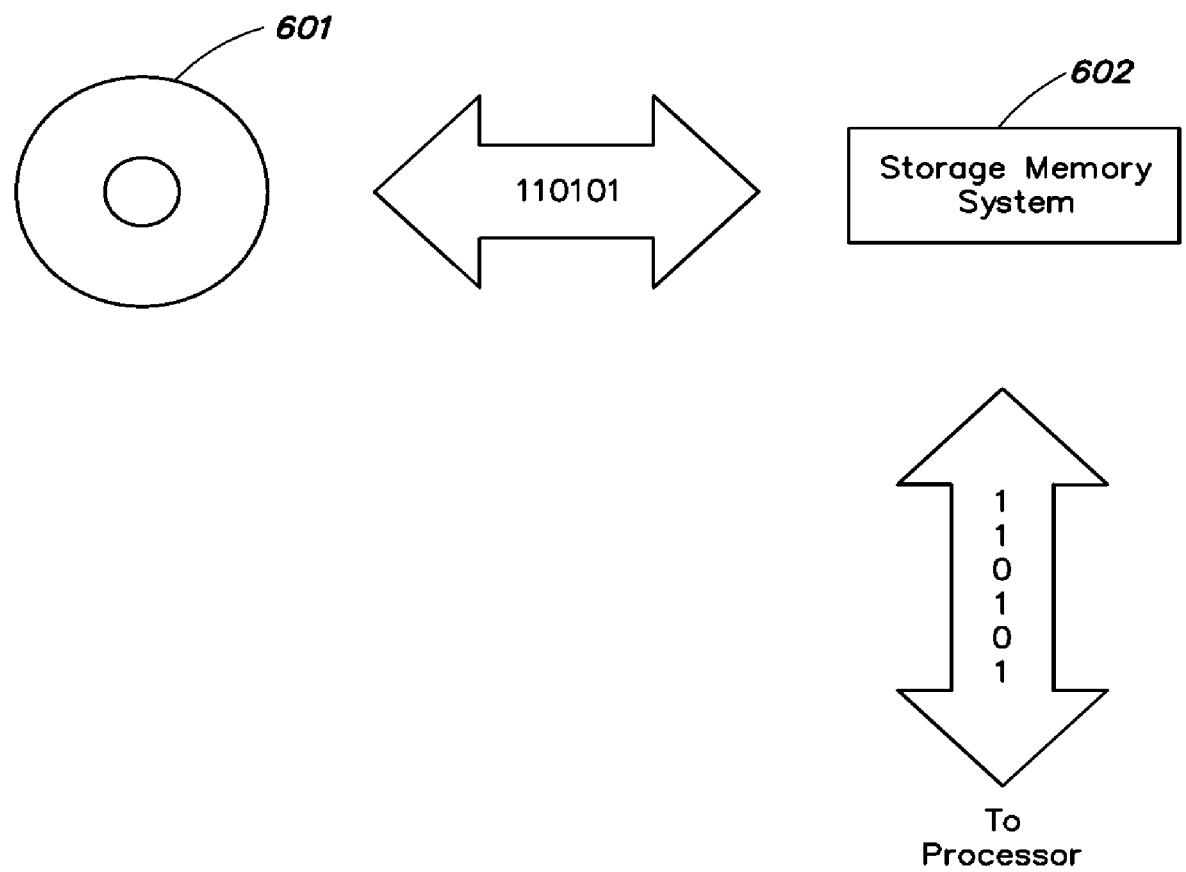
FIG. 6 shows an example storage system capable of implementing various aspects of the present invention.

Any number of systems of distributed system 100 may be implemented on a computer system described below in relation to FIGS. 5 and 6. In particular, FIG. 5 shows an example computer system 500 used to implement various aspects. FIG. 6 shows an example storage system that may be used.

System 500 is merely an illustrative embodiment of a computer system suitable for implementing various aspects of the invention. Such an illustrative embodiment is not intended to limit the scope of the invention, as any of numerous other implementations of the system, for example, are possible and are intended to fall within the scope of the invention. For example, a virtual computing platform may be used. None of the claims set forth below are intended to be limited to any particular implementation of the system unless such claim includes a limitation explicitly reciting a particular implementation.

For example, various aspects of the invention may be implemented as specialized software executing in a general-purpose computer system 500 such as that shown in FIG. 5. The computer system 500 may include a processor 503 connected to one or more memory devices 504, such as a disk drive, memory, or other device for storing data. Memory 504 is typically used for storing programs and data during operation of the computer system 500. Components of computer system 500 may be coupled by an interconnection mechanism 505, which may include one or more busses (e.g., between components that are integrated within a same machine) and/or a network (e.g., between components that reside on separate discrete machines). The interconnection mechanism 505 enables communications (e.g., data, instructions) to be exchanged between system components of system 500. Computer system 500 also includes one or more input devices 502, for example, a keyboard, mouse, scanner, trackball, microphone, touch screen, and one or more output devices 501, for example, a printing device, display screen, and/or speaker. The system may also include any specialized components depending on the application, including any barcode reader, magnetic stripe reader, receipt printer, hand-held or fixed scanners, pin entry devices (PED), or other device types. In addition, computer system 500 may contain one or more interfaces (not shown) that connect computer system 500 to a communication network (in addition or as an alternative to the interconnection mechanism 505).

The storage system 506, shown in greater detail in FIG. 6, typically includes a computer readable and writeable nonvolatile recording medium 601 in which signals are stored that define a program to be executed by the processor or information stored on or in the medium 601 to be processed by the program. The medium may, for example, be a disk or flash memory. Typically, in operation, the processor causes data to be read from the nonvolatile recording medium 601 into another memory 602 that allows for faster access to the information by the processor than does the medium 601. This memory 602 is typically a volatile, random access memory such as a dynamic random access memory (DRAM) or static memory (SRAM). It may be located in storage system 506, as shown, or in memory system 504, not shown. The processor 503 generally manipulates the data within the integrated circuit memory 504, 602 and then copies the data to the medium 601 after processing is completed. A variety of mechanisms are known for managing data movement between the medium 601 and the integrated circuit memory element 504, 602, and the invention is not limited thereto. The invention is not limited to a particular memory system 504 or storage system 506.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 500 is shown by way of example as one type of computer system upon which various aspects of the invention may be practiced, it should be appreciated that aspects of the invention are not limited to being implemented on the computer system as shown in FIG. 5. Various aspects of the invention may be practiced on one or more computers having a different architecture or components that that shown in FIG. 5.

Computer system 500 may be a general-purpose computer system that is programmable using a high-level computer programming language. Computer system 500 may be also implemented using specially programmed, special purpose hardware. In computer system 500, processor 503 is typically a commercially available processor such as the well-known Pentium, Core, Core Vpro, Xeon, or Itanium class processors available from the Intel Corporation.

Many other processors are available. Such a processor usually executes an operating system which may be, for example, the Windows NT, Windows 2000 (Windows ME), Windows XP, Windows Vista, Windows 7 or Windows 8 operating systems available from the Microsoft Corporation, MAC OS Snow Leopard, MAC OS X Lion operating systems available from Apple Computer, the Solaris Operating System available from Sun Microsystems, iOS, Blackberry OS, Windows 7 or 8 Mobile or Android OS operating systems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol. Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented using various Internet technologies such as, for example, the well-known Common Gateway Interface (CGI) script, PHP Hyper-text Preprocessor (PHP), Active Server Pages (ASP), HyperText Markup Language (HTML), Extensible Markup Language (XML), Java, JavaScript, Asynchronous JavaScript and XML (AJAX), Flash, and other programming methods. Further, various aspects of the present invention may be implemented in a cloud- based computing platform, such as the well-known EC2 platform available commercially from Amazon.com, Seattle, Wash., among others. Various aspects of the invention may be implemented as programmed or non-programmed elements, or any combination thereof.

Example Implementations

Figure 7A:
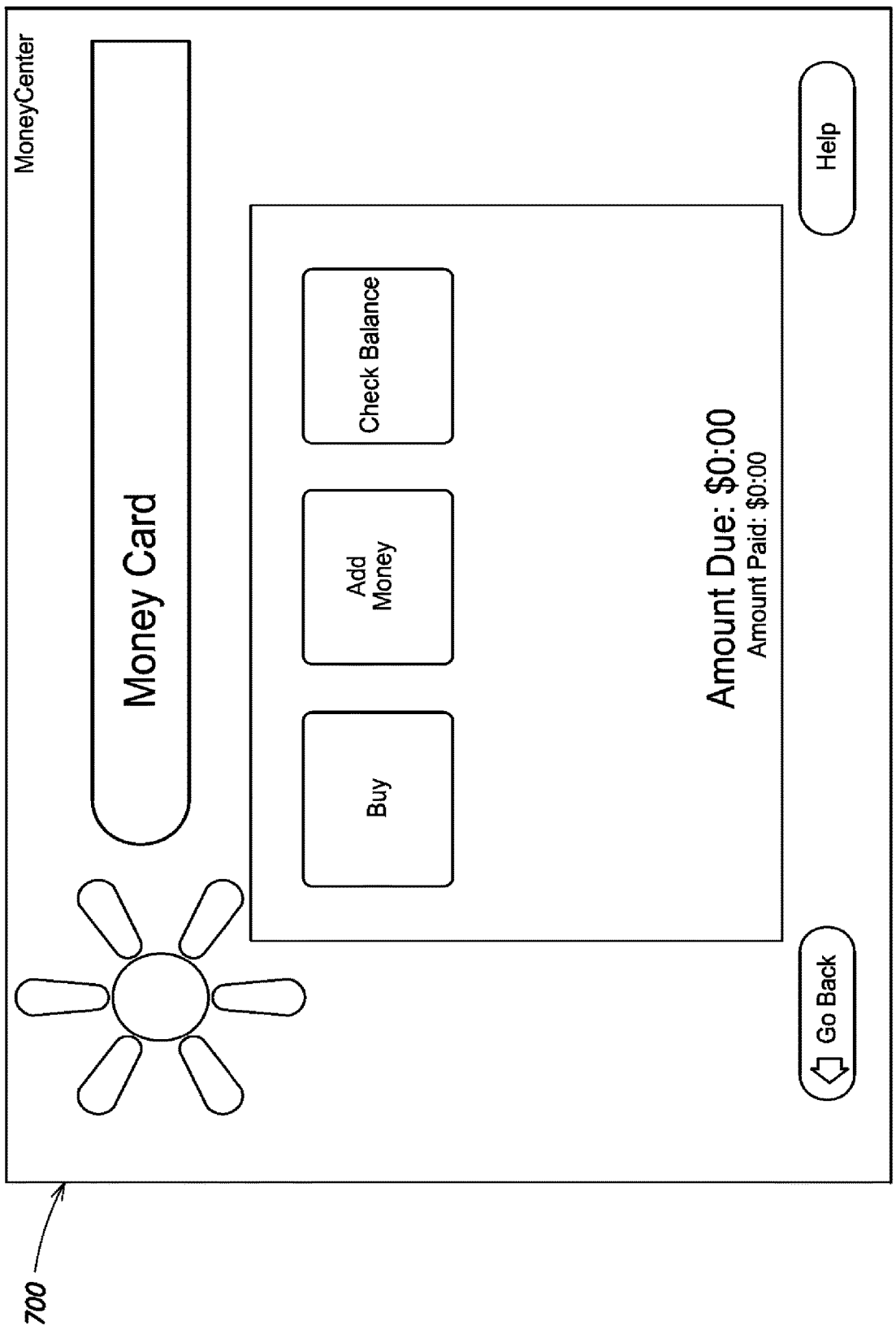
FIGS. 7A-7G show various example implementations of user interfaces of a POS system according to various embodiments of the present invention.

Below are described several implementations of user interfaces according to various embodiments of the present invention. In particular, FIG. 7A shows one example implementation of the interface 700 permits a user to perform various functions with a variety of types of prepaid debit cards. For instance, interface 700 may include one or more controls that permit a user to buy a prepaid money card, add money on a card, or check the current balance of a card. The controls, when selected by a user within the interface, may cause one or more functions to be executed (e.g., by system 114).

Figure 7B:
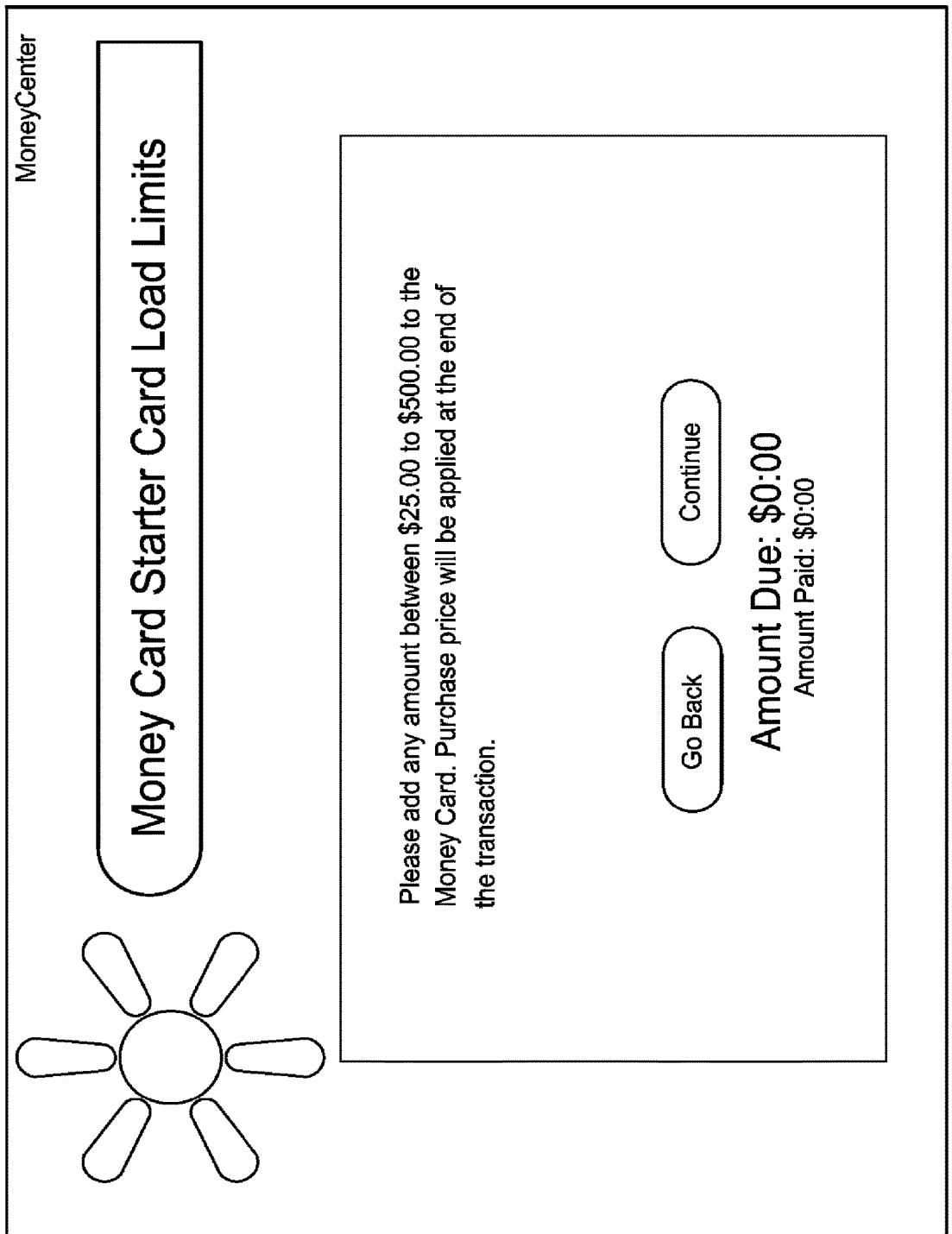

FIG. 7B shows an example interface 710 that may be presented to a user for importing a variable amount of funds to be added to particular card. In the example, any amount between $25 and $500 may be added to the money card, although any amounts or ranges may be used depending on the particular card type. Further, there may be other restrictions, such as add limits for certain cards.

Figure 7C:
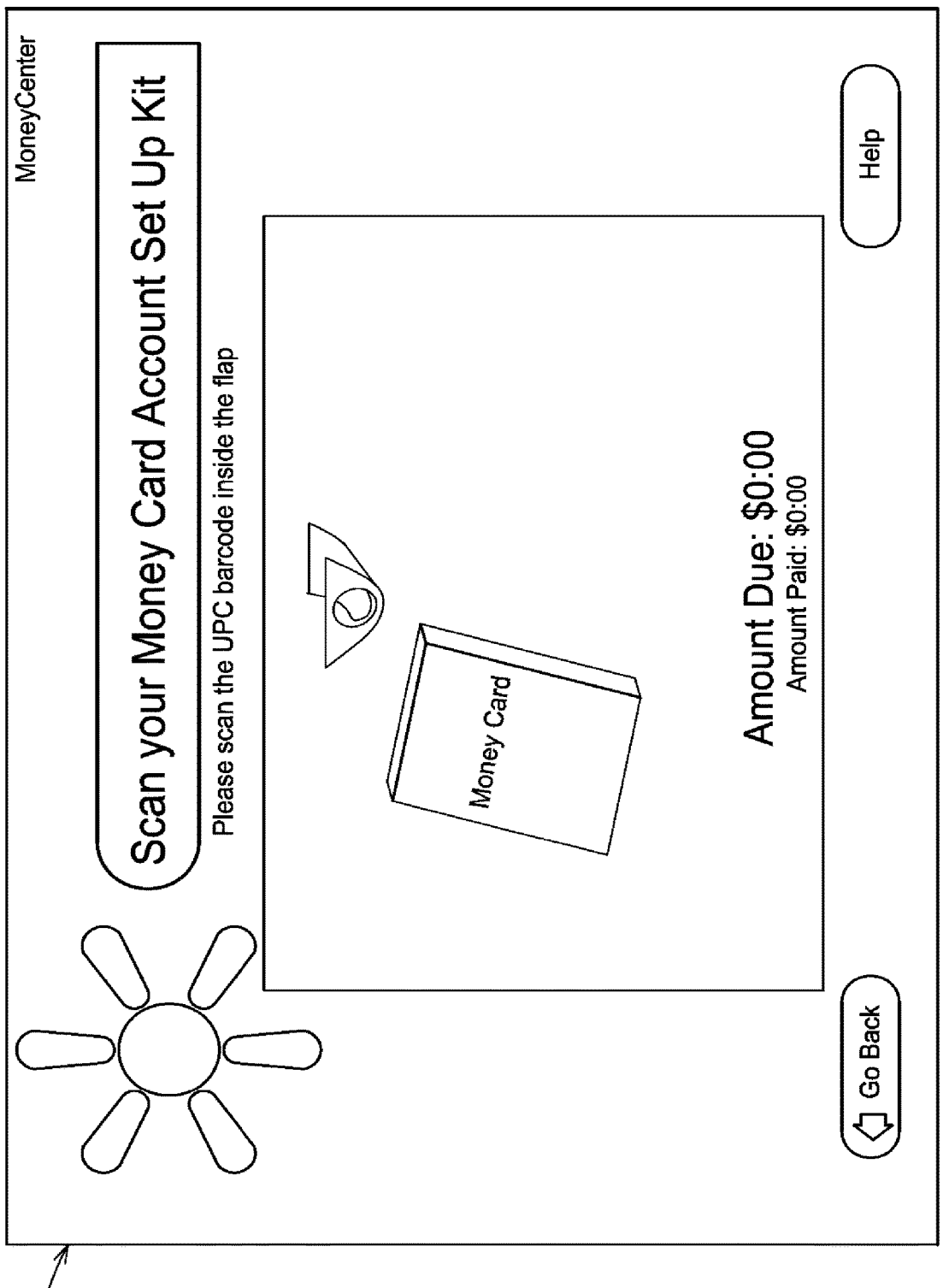
Figure 7D:
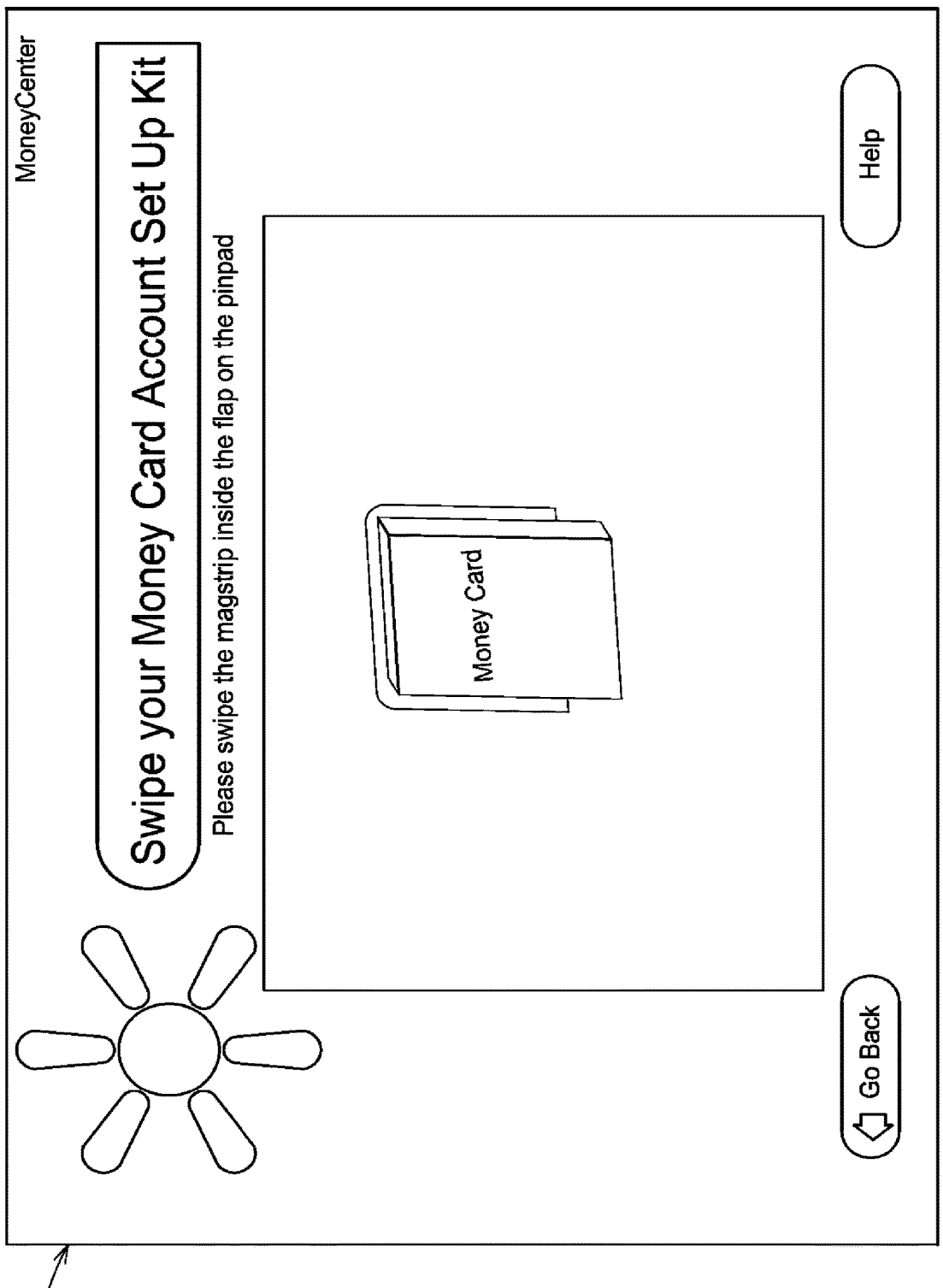

FIG. 7C shows an example interface 720 that may be presented to the user which permits purchase and activation of the prepaid debit card at a POS location by the user. For instance, an interface may be provided that prompts the user to scan, at the self-service system, a UPC code barcode associated with a kit (e.g., a sales kit that is sold at the POS location and includes an associated prepaid debit card). To this end, the self-service system may provide a barcode scanner that can be operated by the user. Alternatively, as shown in FIG. 7D, an interface 730 may be provided that permits the user to swipe a magnetic strip associated with the kit at the self-service system. In either instance, the self-service system may look up a prepaid debit card identifier associated with the scanned information.

Figure 7E:
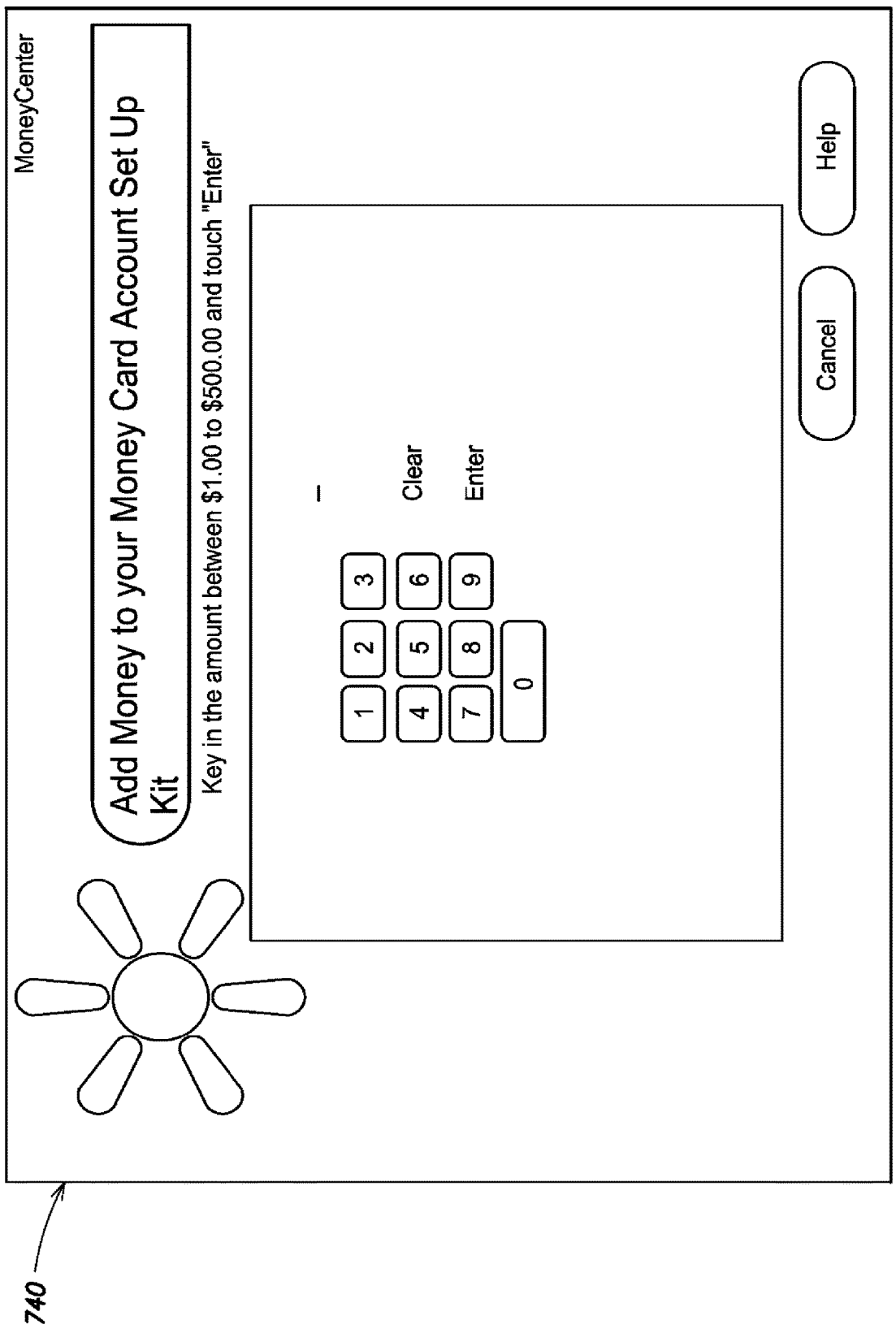
Figure 7F:
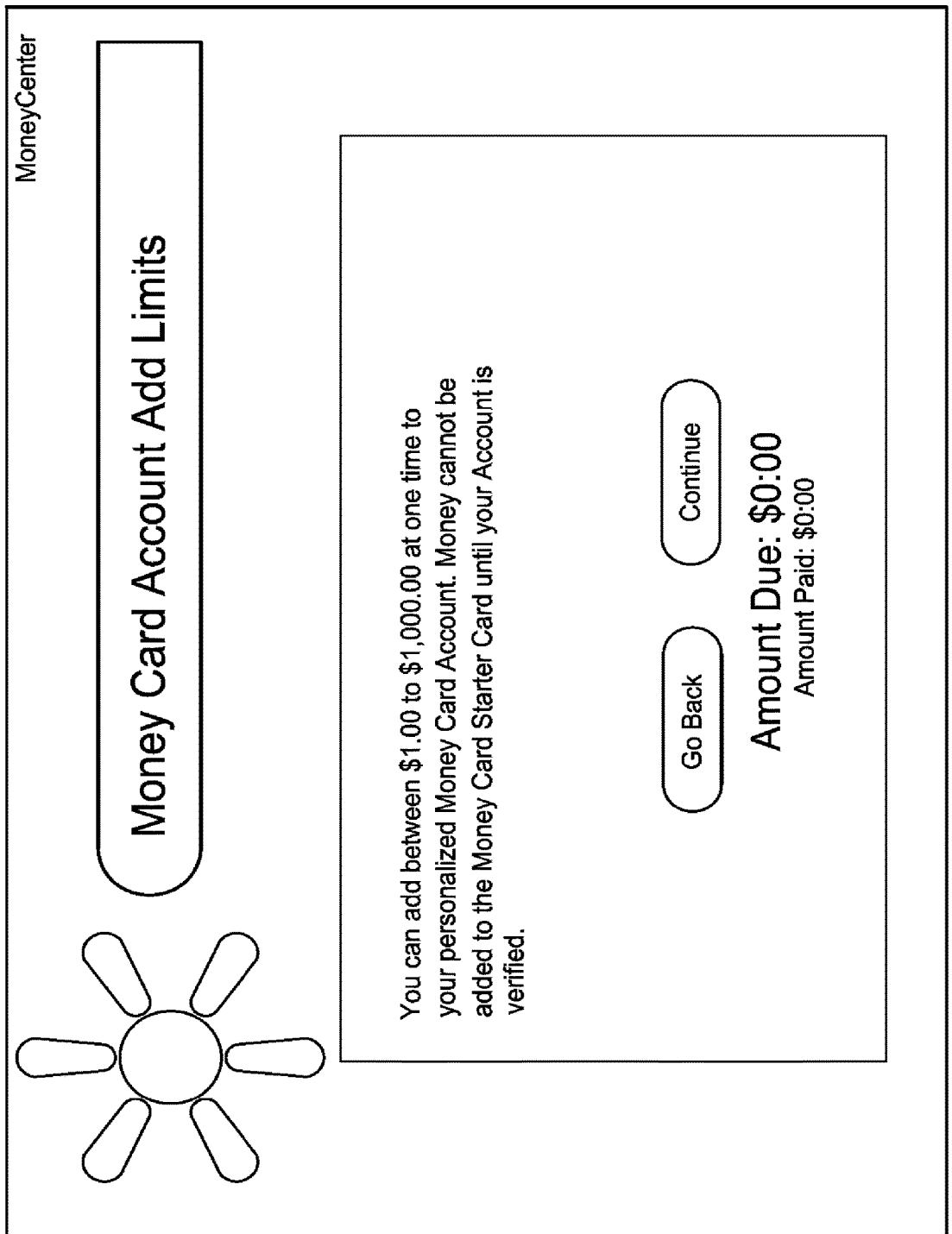

In another embodiment as shown in FIG. 7E, after scanning has been completed, the system may present a user interface 740 that prompts the user to finish a setup process. The process may include the system prompting the user for an initial load amount, and a funding of the card.

Figure 7G:
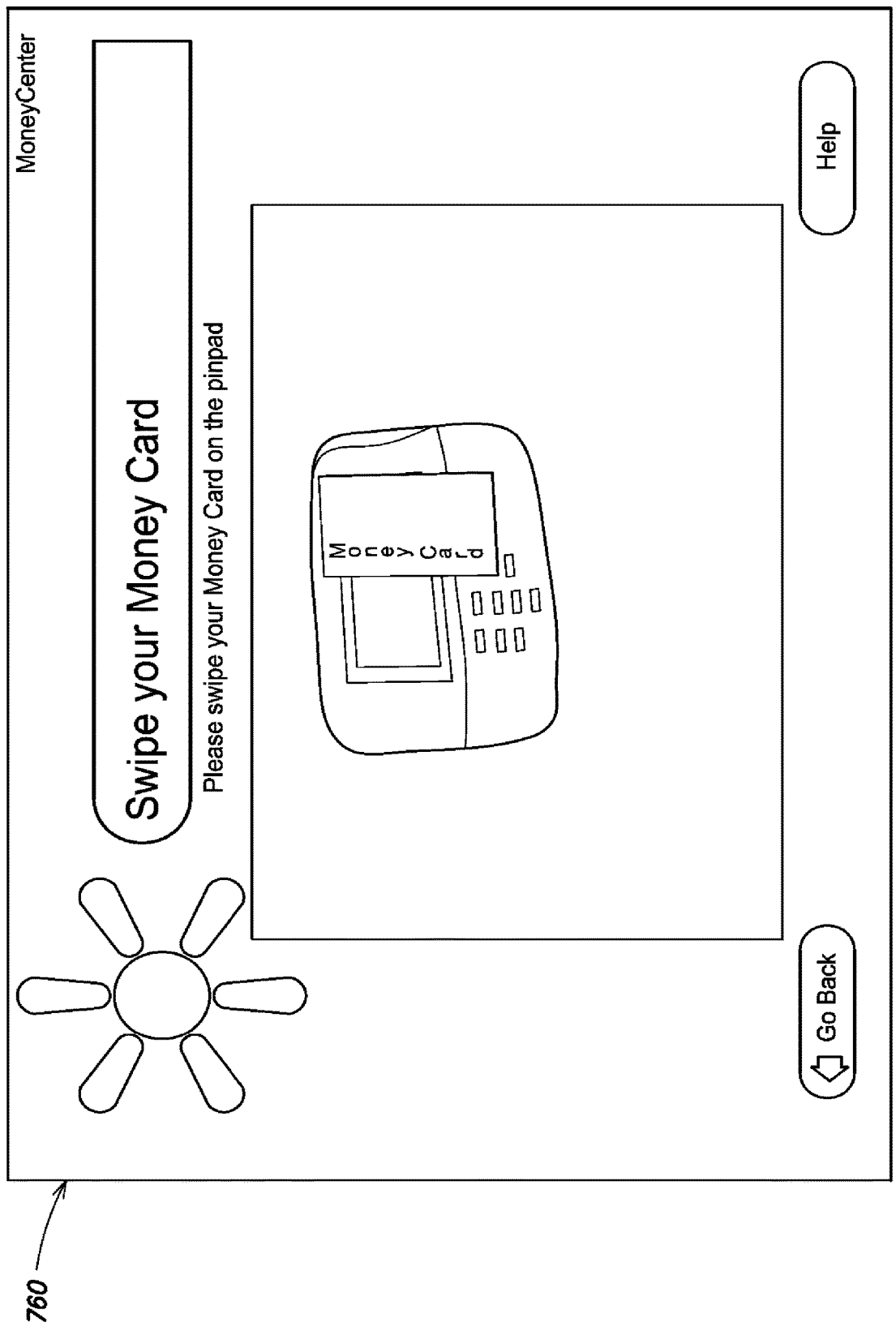

Other interfaces may be presented at various points, allowing the user to manage certain features of the card. Such interfaces may be triggered by the card type determined by the self-service system located at the POS. For instance, an interface 750 may be presented that defines any restrictions relating to the particular prepaid debit card used (e.g., load amount restrictions, daily withdrawal restrictions, etc.). According to another aspect of the present invention, the self-service system may require account verification with card issuer system prior to permitting the user to perform management operations. To this end, the interface (e.g., interface 760 of FIG. 7G), may require the user to swipe their card, provide pin information, or other information (e.g., login credentials) for access to these functions.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

We claim:

1. A system comprising:
   an optical reader;
   a magnetic card reader;
   one or more integrators, each integrator configured to interface with a different third party system;
   a processor operatively coupled to the optical reader and the magnetic card reader, the processor being configured to read a first identifier of a prepaid debit card using the optical reader or a second identifier of the prepaid debit card using the magnetic reader; and
   a user interface operable by a customer, the operatively coupled to the processor,
   wherein, in response to input received via the user interface from the customer, processor controls the optical reader to read the first identifier of the prepaid debit card and controls the magnetic reader to read the second identifier of the prepaid debit card, and
   wherein, prior to permitting the processor to operate to load funds to an account associated with the prepaid debit card via an interaction between the customer and the user interface, the processor validates the prepaid card based on the first identifier read by the optical reader and the second identifier read by the magnetic card reader, and upon validation the processor accesses one of a plurality of third-party systems, based on at least one of the first identifier read by the optical scanner or the second identifier read by the magnetic card reader, and wherein the processor identifies at least one integrator of the one or more integrators, associated with the third party system and uses the at least one integrator to interface with the third party system to load funds onto the account.

2. The system according to claim 1, wherein the processor is further configured to perform a plurality of permitted functions associated with the prepaid card, including at least one of:
purchasing the prepaid debit card; and
checking a balance of prepaid debit card.

3. The system according to claim 1, wherein the user interface is operable by the customer of the prepaid debit card absent intervention of retail personnel.

4. The system according to claim 1, wherein the processor is configured to identify at least one prepaid debit card type of the prepaid debit card from a plurality of prepaid debit card types provided by a plurality of card providers.

5. The system according to claim 4, wherein the processor is configured to determine, based on the at least one prepaid debit card type of the prepaid debit card, at least one restriction of the prepaid debit card.

6. The system according to claim 1, wherein the customer of the prepaid debit card is permitted to purchase the prepaid debit card using the interface of the system.

7. The system according to claim 6, wherein the end user of the prepaid debit card is permitted to purchase the prepaid debit card absent intervention of retail personnel.

8. A self-service system comprising:
an optical reader;
a magnetic card reader;
a processor operatively coupled to the optical reader and the magnetic card reader, the processor being configured to read a first identifier of a prepaid debit card using the optical reader or a second identifier of the prepaid debit card using the magnetic reader; and
a user interface operable by a customer, the operatively coupled to the processor,
wherein, in response to input received via the user interface from the customer, processor controls the optical reader to read the first identifier of the prepaid debit card and controls the magnetic reader to read the second identifier of the prepaid debit card, and
wherein, prior to permitting the processor to operate to load funds to an account associated with the prepaid debit card via an interaction between the customer and the user interface, the processor validates the prepaid card based on the first identifier read by the optical reader and the second identifier read by the magnetic card reader, and upon validation the processor accesses one of a plurality of third-party systems, based on at least one of the first identifier read by the optical scanner or the second identifier read by the magnetic card reader;
wherein the third-party system provides an interface on the self-service to load funds to the account,
wherein in response to loading funds to the account, the second identifier is read by the magnetic card reader to perform one or more functions associated with the account, and
wherein in response to performing one or more functions associated with the account, the processor transmits one or more commands to the third party system.

9. The system according to claim 1, wherein the processor is further configured to perform a plurality of permitted functions associated with the prepaid card, including at least one of:
purchasing the prepaid debit card; and
checking a balance of prepaid debit card.

10. The system according to claim 1, wherein the user interface is operable by the customer of the prepaid debit card absent intervention of retail personnel located at the self-service system.

11. The system according to claim 1, wherein the processor is configured to identify at least one prepaid debit card type of the prepaid debit card from a plurality of prepaid debit card types provided by a plurality of card providers.

12. The system according to claim 5, wherein the processor is configured to determine, based on the at least one prepaid debit card type of the prepaid debit card, at least one restriction of the prepaid debit card.

13. The system according to claim 1, wherein the customer of the prepaid debit card is permitted to purchase the prepaid debit card using the interface of the system.

14. The system according to claim 8, wherein the end user of the prepaid debit card is permitted to purchase the prepaid debit card absent intervention of retail personnel located at the self-service system.

15. A method performed by a self-service system, the method comprising:
reading, by an optical reader, a first identifier of a prepaid debit card;
reading, by a magnetic card reader a second identifier of the prepaid debit card;
processing, by a processor of a self-service system, the first identifier of the prepaid debit card read by the optical reader and the second identifier of the prepaid debit card read by the magnetic card reader; and
receiving, via a user-interface of the self-service system, a request from the customer to load funds to an account associated with the prepaid debit card,
wherein prior to permitting the self-service system to operate to load funds to the account associated with the prepaid debit card in response to the request, the self-service system validates the prepaid card based on the first identifier read by the optical reader and the second identifier read by the magnetic card reader, and upon validation, the processor accesses one of a plurality of third-party systems located at a different location than the self-service system based on at least one of the first identifier read by the optical scanner or the second identifier read by the magnetic card reader;
wherein the third-party system provides an interface on the self-service system to loads funds to the account,
wherein in response to loading funds to the account, the second identifier is read by the magnetic card reader to perform one or more functions associated with the account, and
wherein in response to performing one or more functions associated with the account, the processor transmits one or more commands to the third party system.

16. The method according to claim 15, wherein the processor is further configured to perform a plurality of permitted functions associated with the prepaid card, including at least one of:
purchasing the prepaid debit card; and
checking a balance of prepaid debit card.

17. The method according to claim 15, wherein the user interface is operable by the customer end user of the prepaid debit card absent intervention of retail personnel located at the self-service system.

18. The method according to claim 15, further comprising an act of identifying, by the system, at least one prepaid debit card type of the prepaid debit card from a plurality of prepaid debit card types provided by a plurality of card providers.

19. The method according to claim 18, further comprising an act of determining, by the system based on the at least one prepaid debit card type of the prepaid debit card, at least one restriction of the prepaid debit card.

20. The method according to claim 15, further comprising an act of permitting, by the self-service system, the customer of the prepaid debit card to purchase the prepaid debit card using the interface of the self-service system.

\* \* \* \* \*